Figure 1:
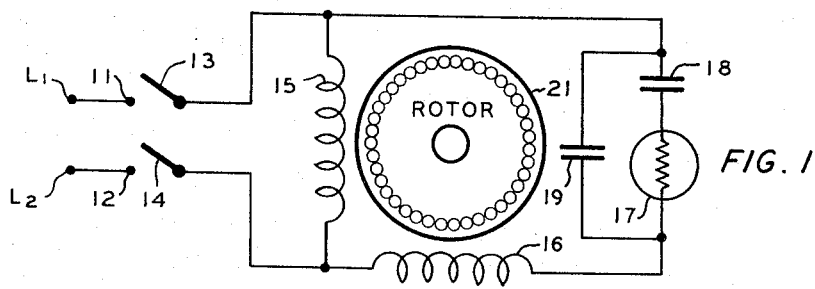

Feb. 7, 1967  R. L. MARTIN  3,303,402
SINGLE PHASE INDUCTION MOTOR
Filed Jan. 9, 1964

INVENTOR.
R.L. MARTIN
BY Young & Quigg
ATTORNEYS

United States Patent Office 3,303,402
Patented Feb. 7, 1967

3,303,402
SINGLE PHASE INDUCTION MOTOR
Robert L. Martin, Roseville, Minn., assignor to Phillips
Petroleum Company, a corporation of Delaware
Filed Jan. 9, 1964, Ser. No. 336,775
8 Claims. (Cl. 318—221)

This invention relates to single phase induction motors. In a particular aspect the invention relates to a novel control system for providing starting and running torque in single phase induction motors.

The use of single phase induction motors for operating compressors, pumps and the like is well known. Because a single phase induction motor has zero starting torque, torque and the motor must attain considerable speed before an auxiliary means must be utilized to provide starting fore it develops sufficient torque to overcome its own friction and windage. A common means for starting single phase induction motors is the utilization of an auxiliary winding on the stator in space quadrature with the main stator winding, the two stator windings being connected in parallel to the power lines. A phase displacement between the current in the stator windings is produced by switching resistance, inductive or capacitive reactance or a combination of these in series with one of the windings. When capacitance is used, the motor is generally called a capacitor or capacitor start motor, otherwise the motor is designated as a split phase type of single phase induction motor. The split phase motor can have a resistance or an inductance either connected in series, or more commonly as an integral part of one of the windings, or in some cases both can be used, for example, a resistance in one winding and an inductance in series with the other winding. In any case the added resistance and/or inductance and one of the windings is cut out of the circuit after the motor is started. This can be accomplished by either shorting the impedance out of the circuit or where the impedance is utilized as part of or in series with the auxiliary winding, disconnecting the auxiliary winding at about three-fourths of synchronous speed by means of a centrifugally operated switch, a voltage sensitive relay, or a current sensitive relay.

Although a capacitor motor can be built with a single value of capacitance permanently connected in series with the auxiliary winding, the size of such a capacitor must be a compromise between that best for starting and that best for running. In order to secure the best starting torque and also the best operating characteristics under load, it is necessary to use two values of capacitance, one for starting and one for running. In a capacitor-start motor the auxiliary winding can be cut out when the motor is up to speed. For capacitor-start, capacitor-run motors, the amount of the capacitance or the capacitance impedance in series with the auxiliary winding can be changed between starting and running conditions, either by means of a switched autotransformer connection which changes the voltage on the capacitance and its effective impedance or by an actual change in the amount of capacitance, accomplished by switching one of two capacitors out at or near full speed. A centrifugally controlled switch is often utilized to change the capacitors in the circuit or to change the input terminal on the autotransformer.

In certain installations, for example gasoline pumps or compressors for flammable gases, it is desirable to utilize a motor having both high starting torque and good operating characteristics while at the same time avoiding the necessity of employing mechanical switches or relays which are subject to arcing at their contacts and thus prevent explosion hazards.

In accordance with the invention it has been discovered that good starting torque and good operating characteristics can be achieved with a single phase induction motor while eliminating the use of conventional switches or relay contacts to change the auxiliary winding connection from starting condition to running condition. This can be accomplished by the utilization of positive temperature coefficient resistors in combination with the operating impedance in the auxiliary winding and its back E.M.F. or speed induced voltage such that when the positive temperature coefficient resistor is cold and the voltage across it is low the circuit provides the desired value of starting impedance and when the positive temperature coefficient resistor is heated and the voltage is increased under running conditions the circuit provides the desired value of running impedance.

Accordingly it is an object of the invention to provide a novel means for starting and running a single phase induction motor. Another object of the invention is to provide a single phase induction motor having both high starting torque and good operating characteristics. Yet another object of the invention is to provide a single phase induction motor which does not require switching means for obtaining the best starting and operating conditions. A still further object of the invention is to provide a two value capacitor motor which does not require switching means to change from one value to the other.

Other aspects, objects and advantages of the invention will be apparent from a study of the disclosure, the drawing and the appended claims to the invention.

Figure 2:
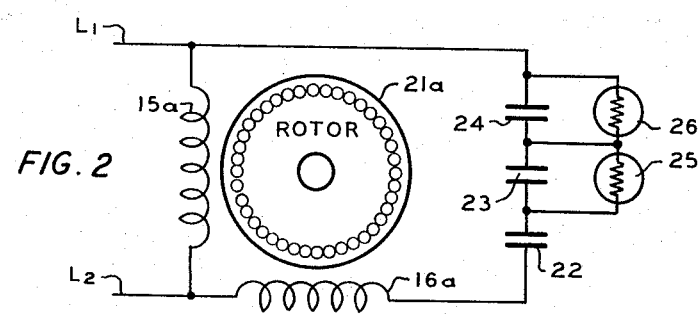
Figure 3:
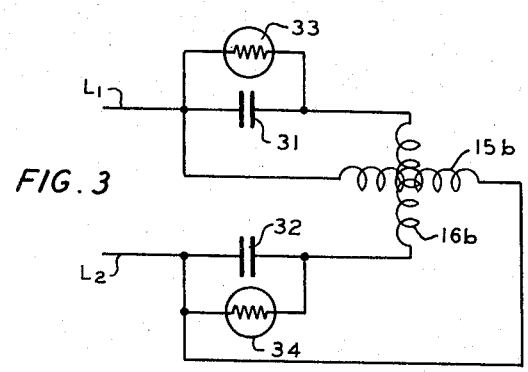
Figure 4:
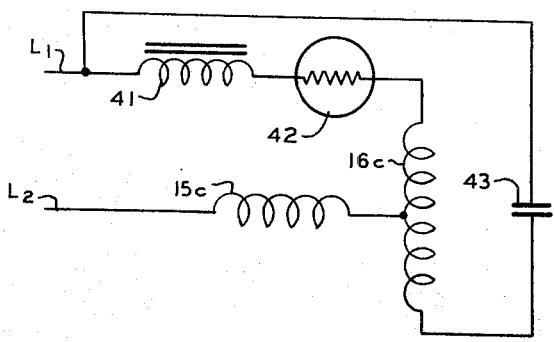

In the drawings FIGURES 1 and 2 are schematic representations of a capacitance-start, capacitance-run motor in accordance with first and second embodiments of the invention, FIGURE 3 is a resistance-start, capacitance-run motor incorporating the invention, and FIGURE 4 is a reactance-start, capacitance-run motor embodying the invention.

Referring now to the drawings and to FIGURE 1 in detail power lines $L_1$ and $L_2$ are connected to terminals 11 and 12 of switches 13 and 14, respectively. Main winding 15 of a single phase induction motor is connected between the contactors of switches 13 and 14. An auxiliary winding 16, positive temperature coefficent resistance 17 and capacitor 18 are connected in series between the contactors of switches 13 and 14 and thus in parallel with main winding 15. A second capacitor 19 is connected in parallel with the series circuit comprising resistance 17 and capacitor 18. Rotor 21 is the squirrel-cage type. Windings 15 and 16 are distributed single-phase windings, usually having a fractional pitch. By subdividing, a single winding can serve as both the main winding and the auxiliary winding. While resistance 18 can be any suitable positive temperature coefficient resistance, for example thermistors or incandescent lamps, the incandescent lamps are particularly useful where a pilot light is also desired as they can serve both functions. As the motor accelerates, the voltage applied across the network comprised of resistor 17 and capacitors 18 and 19, rises, and as the lamp filament heats up, the lamp resistance increases. The time constant and allowable voltage can be controlled by suitable thermal lagging of the lamp filament or encapsulation of a thermistor. Thus the series parallel combination of resistor 17 and capacitors 18 and 19 has a first value of effective capacitance under starting conditions and a second value of effective capacitance under running conditions due to the increase in the resistance of resistor 17.

As an illustration, where a particular motor requires approximately 15 mfd. for desirable starting characteristics, but should have no more than 4 mfd. capacitance on the auxiliary winding for desirable running conditions, the circuit of FIGURE 1 can be utilized with the following values: capacitor 18, 15 mfd.; capacitor 19, 3 mfd.; resistor 17, a 25 watt 250 volt incandescent lamp having a cold resistance of approximately 167 ohms and a hot resistance under running conditions of approximately 2500 ohms. Under starting conditions the series parallel combination of resistor 17 and capacitors 18 and 19 has an impedance of approximately 200 $\angle -56.6°$ or 110 $-j$ 167 ohms, comparable to $-j$ 177 ohms for a 15 mfd. capacitor. Under running conditions the series parallel combination has an impedance of approximately 814 $\angle -71°$ or 265 $-j$ 770 ohms, comparable to a 3.5 mfd. capacitor. The 25 watt lamp can also serve as the pilot or signal light. A positive temperature coefficient thermistor can be utilized instead of the 25 watt lamp. A Westinghouse Type 802–1 in the previously described circuit yields 156 $\angle -74.5$ ohms cold and 865 $\angle -80°$ ohms at temperatures encountered under running conditions. The voltage across capacitor 18 during normal running is on the order of 8 volts, permitting the use of an A.C. electrolytic capacitor.

Referring now to FIGURE 2 there is illustrated a configuration where the capacitors are series connected. Auxiliary winding 16a and capacitors 22, 23, and 24 are connected in series between lines $L_1$ and $L_2$. Positive temperature coefficient resistors 25 and 26 are connected in parallel with capacitors 23 and 24, respectively. In a circuit where capacitor 24 and resistor 26 are omitted, capacitors 22 and 23 are 20 mfd. and 5 mfd., respectively, and resistor 25 is a Westinghouse Type 802–1 thermistor, a starting impedance of approximately 152 $\angle -67°$ ohms is provided. This is approximately equivalent to a 17.5 mfd. starting capacitor. The same circuit provides 662 $\angle -85°$ ohms under running conditions, roughly equivalent to a 4 mfd. running capacitor. The circuit lends itself to applications which might otherwise exceed thermistor voltage limits, since two or more thermistors can be utilized in series, as shown in FIGURE 2.

FIGURES 3 and 4 illustrate circuits with motor windings rearranged to permit an optimum turns ratio between main and auxiliary windings without exceeding the voltage or dissipation ratings of suitable commonly available thermistors or incandescent lamps. These arrangements can be utilized with the networks of FIGURES 1 or 2 as well as with the capacitance-resistance and inductance-resistance networks shown. In FIGURE 3 capacitors 31 and 32 are connected in series with auxiliary winding 16b between lines $L_1$ and $L_2$. Main winding 15b is also connected between lines $L_1$ and $L_2$. Positive temperature coefficient resistors 33 and 34 are connected in parallel with capacitors 31 and 32, respectively. The motor is essentially a resistance-start, capacitance-run motor, somewhat similar to a conventional split-phase motor except that the high losses which ordinarily occur in the auxiliary winding during start-up are dissipated outside the motor in the lamp or thermistor, and the auxiliary winding remains in the circuit to improve running performance.

Referring now to FIGURE 4, main winding 15c is connected between line $L_2$ and an intermediate point on auxiliary winding 16c. Inductance 41 and positive temperature coefficient resistor 42 are connected between line $L_1$ and a first end of winding 16c. Capacitor 43 is connected between $L_1$ and the second end terminal of winding 16c. Thus, the motor is a reactance-start, capacitor-run motor.

Thermistors and tungsten incandescent lamps are generally suitable for use as the positive temperature coefficient resistors with motors employed to drive small pumps, such as the ⅓ H.P. submerged motor-pumps commonly used to pump gasoline in service stations. Such motors are generally started frequently and require sufficient starting torque for breakaway of static friction, moderate accelerating torque, and high break-down torque. For applications requiring sustained high accelerating torque or high inertia loads, ballast tubes or other active elements of higher thermal capacity than lamp filaments are preferable and can be utilized in the circuits described herein.

The circuits in accordance with the invention have the advantages of providing high starting torque while maintaining high running efficiency, eliminating moving contact switches and thus avoiding arcing or sparking, and providing a control element which can also be utilized as a pilot light.

Reasonable variations and modifications are possible within the scope of the foregoing disclosure, the drawings and the appended claims to the invention.

I claim:

1. Apparatus comprising a single phase motor having a squirrel-cage rotor, a main winding, an auxiliary winding, and first and second power input terminals; means for connecting said main winding between said first and second power input terminals; first and second capacitors; a positive temperature coefficient resistor; means for connecting said auxiliary winding, said first capacitor and said positive temperature coefficient resistor in series between said first and second power input terminals; and means for connecting said second capacitor in parallel with the series combination of said first capacitor and said positive temperature coefficient resistor.

2. Apparatus in accordance with claim 1 wherein said positive temperature coefficient resistor is an incandescent lamp.

3. Apparatus in accordance with claim 1 wherein said positive temperature coefficient resistor is a thermistor.

4. Apparatus in accordance with claim 1 wherein said positive temperature coefficient resistor is a ballast tube.

5. Apparatus comprising a single phase motor having a squirrel-cage rotor, a main winding, an auxiliary winding, and first and second power input terminals; means for connecting said main winding between said first and second power input terminals; first and second capacitors; a positive temperature coefficient resistor; means for connecting said auxiliary winding, and said first and second capacitors in series between said first and second power input terminals; and means for connecting said positive temperature coefficient resistor in parallel with said second capacitor.

6. Apparatus comprising a single phase motor having a squirrel-cage rotor, a main winding, an auxiliary winding, and first and second power input terminals; means for connecting said main winding between said first and second power input terminals; first, second and third capacitors; first and second positive temperature coefficient resistors; means for connecting said auxiliary winding and said first, second and third capacitors in series between said first and second power input terminals; means for connecting said first positive temperature coefficient resistor in parallel with said first capacitor; and means for connecting said second positive temperature coefficient resistor in parallel with said second capacitor.

7. Apparatus comprising a single phase motor having a squirrel-cage rotor, a main winding, an auxiliary winding, and first and second power input terminals; means for connecting said main winding between said first and second power input terminals; first and second capacitors; first and second positive temperature coefficient resistors; means for connecting said auxiliary winding and said first and second capacitors in series between said first and second power input terminals; means for connecting said first positive temperature coefficient resistor in parallel with said first capacitor; and means for connecting said second positive temperature coefficient resistor in parallel with said second capacitor.

8. Apparatus comprising a single phase motor having a squirrel-cage rotor, a main winding, an auxiliary winding, and first and second power input terminals, means for connecting said main winding between said first power input terminal and an intermediate point on said auxiliary winding; an inductance; a positive temperature coefficient resistor; means for connecting said inductance and said positive temperature coefficient resistor in series between said second power input terminal and a first end terminal of said auxiliary winding; a capacitor; and means for connecting said capacitor between said second power input terminal and the second end terminal of said auxiliary winding.

References Cited by the Examiner

UNITED STATES PATENTS

| | | |
|---|---|---|
| 2,261,250 | 11/1941 | Haddad. |
| 2,340,502 | 2/1944 | Baker _____ 317—41 X |
| 2,991,402 | 7/1961 | Imada et al. _____ 318—221 |

FOREIGN PATENTS

| | | |
|---|---|---|
| 382,209 | 10/1932 | Great Britain. |
| 451,099 | 7/1936 | Great Britain. |
| 454,265 | 9/1936 | Great Britain. |

ORIS L. RADER, *Primary Examiner.*

G. Z. RUBINSON, *Assistant Examiner.*